(12) United States Patent
Bless et al.

(10) Patent No.: US 6,609,037 B1
(45) Date of Patent: Aug. 19, 2003

(54) GIMBAL POINTING VECTOR STABILIZATION CONTROL SYSTEM AND METHOD

(75) Inventors: Robert R. Bless, Allen, TX (US); James C. Debruin, Dallas, TX (US); Yale P. Vinson, Flower Mound, TX (US); Martin A. Wand, Plano, TX (US)

(73) Assignee: Raytheon Company, Lexington, MA (US)

( * ) Notice: Subject to any disclaimer, the term of this patent is extended or adjusted under 35 U.S.C. 154(b) by 377 days.

(21) Appl. No.: 09/731,204

(22) Filed: Dec. 6, 2000

Related U.S. Application Data
(60) Provisional application No. 60/169,120, filed on Dec. 6, 1999.

(51) Int. Cl.[7] ................................................ G05B 13/02
(52) U.S. Cl. ........................... 700/45; 700/44; 700/37; 700/39; 700/55; 700/56; 700/71; 701/210; 701/213; 701/215; 244/164; 244/165; 244/172; 73/865.9; 73/510; 73/503.3; 73/504.09; 73/504.08
(58) Field of Search ............................ 700/19, 20, 35, 700/37, 39, 45, 55, 56, 57, 61, 71; 701/220, 213, 215; 73/865.9, 510, 503.3, 503.09, 504.08; 244/164, 165, 172, 3.23

(56) References Cited

U.S. PATENT DOCUMENTS

| | | | | |
|---|---|---|---|---|
| 3,974,699 A | * | 8/1976 | Morris et al. ............... 73/865.9 |
| 4,275,605 A | * | 6/1981 | Kennel ....................... 74/5.34 |
| 4,881,800 A | * | 11/1989 | Fuchs et al. ................. 359/555 |
| 5,280,431 A | * | 1/1994 | Summerville et al. ......... 701/24 |
| 5,367,456 A | * | 11/1994 | Summerville et al. ......... 701/24 |
| 6,122,595 A | * | 9/2000 | Varley et al. ................ 701/220 |
| 6,311,931 B1 | * | 11/2001 | Smay ......................... 244/164 |
| 6,332,592 B1 | * | 12/2001 | Longuski et al. ............ 244/172 |

\* cited by examiner

Primary Examiner—Ramesh Patel
(74) Attorney, Agent, or Firm—Baker Botts L.L.P.

(57) ABSTRACT

A hybrid stabilization system for isolating a pointing vector of a gimbal from the motion of a vehicle base is provided. The hybrid stabilization control system includes a rate feedback loop generating a rate feedback compensation value in response to a measured rate difference between a pointing vector rate of motion and a vehicle base rate of motion, a rate feedforward loop generating a rate feedforward compensation value in response to a measured inertial vehicle base rate of motion, a position feedback loop generating a position feedback compensation value in response to a measured position difference between a pointing vector angular position and a vehicle base angular position, a position feedforward loop generating a position feedforward compensation value in response to a measured inertial vehicle base angular position. A controller receives a pointing vector position command and generates a gimbal control signal in response to the rate feedback compensation value, rate feedforward compensation value, position feedback compensation value, and position feedforward compensation value.

34 Claims, 5 Drawing Sheets

GIMBAL POINTING VECTOR STABILIZATION CONTROL SYSTEM AND METHOD

RELATED APPLICATIONS

This application claims the benefit of Provisional Application No. 60/169,120 filed Dec. 6, 1999.

TECHNICAL FIELD OF THE INVENTION

This invention is related in general to the field of control systems. More particularly, the invention is related to a gimbal pointing vector stabilization control system and method.

BACKGROUND OF THE INVENTION

Stabilization is the function of holding steady the line-of-sight vector of a gimbaled sensor system subject to the motion of the vehicle to which the sensor base is attached. The line-of-sight vector or the pointing vector is the imaginary line from the aperture center of the gimbaled sensor to the target of interest. As the vehicle base of the gimbal moves or rotates, the gimbal must move equal and opposite as the body in order to remain pointing at the target. The problem is complicated by the fact that often it is impossible to mount a sensing device on the gimbal itself to measure the effects of vehicle base motion.

Feedback control is a technique that has been utilized extensively in pointing vector stabilization systems. Feedback control involves the measurement of a desired plant state with a sensor, and the comparison of this measured state with the desired command. Any plant input is driven by the error between the commanded state and the actual measured state. Feedback stabilization systems use sensing elements mounted directly to the gimbal to sense the effects of vehicle base motion. Feedforward stabilization is used when such sensors cannot be mounted to the gimbal.

Current approaches to feedforward stabilization include what is known as position feedforward and rate feedforward. Position feedforward techniques determine the angle that the body has rotated and attempts to move the gimbal an equal and opposite amount. Rate feedforward techniques determine the speed that the body is spinning and attempts to move the gimbal at an equal and opposite speed.

There are many error sources and difficult challenges that must be overcome when using these known methods. For example, some type of measuring device must be available to detect the angle that the gimbal is at and/or the speed at which it is turning. Likewise, a measuring device such as a gyroscope is mounted on the vehicle base to detect its motion. These measuring devices inevitably have scale factor errors, biases, and latencies associated with them that deteriorates the performance of the gimbal stabilization.

SUMMARY OF THE INVENTION

Accordingly, there is a need for an accurate gimbal stabilization control system and method which eliminates or substantially reduce the disadvantages associated with prior control systems.

In one aspect of the invention, a hybrid stabilization system for isolating a pointing vector of a gimbal from the motion of a vehicle base is provided. The hybrid stabilization control system includes a rate feedback loop generating a rate feedback compensation value in response to a measured rate difference between a pointing vector rate of motion and a vehicle base rate of motion, a rate feedforward loop generating a rate feedforward compensation value in response to a measured inertial vehicle base rate of motion, a position feedback loop generating a position feedback compensation value in response to a measured position difference between a pointing vector angular position and a vehicle base angular position, a position feedforward loop generating a position feedforward compensation value in response to a measured inertial vehicle base angular position. A controller receives a pointing vector position command and generates a gimbal control signal in response to the rate feedback compensation value, rate feedforward compensation value, position feedback compensation value, and position feedforward compensation value.

In another aspect of the invention, a hybrid stabilization system for isolating a pointing vector of a gimbal from the motion of a measurable disturbance is provided. The system includes a relative rate sensor measuring a rate difference between a pointing vector rate of motion and a disturbance rate of motion, and a rate feedback loop generating a rate feedback compensation value in response to the rate difference. An inertial rate sensor measuring an inertial disturbance rate of motion, and a rate feedforward loop generating a rate feedforward compensation value in response to the inertial disturbance rate are also included. The system further includes a relative angular position sensor measuring a position difference between a pointing vector angular position and a disturbance angular position, and a position feedback loop generating a position feedback compensation value in response to the position difference. An inertial angular position sensor measuring an inertial disturbance angular position and a position feedforward loop generating a position feedforward compensation value in response to the inertial disturbance angular position are included. The system also includes a controller receiving a pointing vector position command and generating a gimbal control signal in response to the rate feedback compensation value, rate feedforward compensation value, position feedback compensation value, and position feedforward compensation value.

In yet another aspect of the invention, a hybrid stabilization method for isolating a pointing vector of a gimbal from the motion of a vehicle base includes the steps of generating a rate feedback compensation value in response to a measured rate difference between a pointing vector rate of motion and a vehicle base rate of motion, generating a rate feedforward compensation value in response to a measured inertial vehicle base rate of motion, generating a position feedback compensation value in response to a measured position difference between a pointing vector angular position and a vehicle base angular position, generating a position feedforward compensation value in response to a measured inertial vehicle angular position, and receiving a pointing vector position command and generating a gimbal control signal in response to the rate feedback compensation value, rate feedforward compensation value, position feedback compensation value, and position feedforward compensation value.

In yet another aspect of the invention, the inventive steps of a hybrid stabilization method for isolating a pointing vector of a gimbal from the motion of a vehicle base include measuring a rate difference between a pointing vector rate of motion and a vehicle base rate of motion, generating a rate feedback compensation value in response to the rate difference, measuring an inertial vehicle base rate of motion, generating a rate feedforward compensation value in response to the inertial vehicle base rate, measuring a position difference between a pointing vector angular position and a vehicle base angular position, generating a position feedback compensation value in response to the position difference, measuring an inertial vehicle base angular position, generating a position feedforward compensation value in response to the inertial vehicle angular position, and receiving a pointing vector position command and generating a gimbal control signal in response to the rate feedback compensation value, rate feedforward compensation value, position feedback compensation value, and position feedforward compensation value.

BRIEF DESCRIPTION OF THE DRAWINGS

For a better understanding of the present invention, reference may be made to the accompanying drawings, in which:

FIG. 1 is a block diagram of an embodiment of a hybrid stabilization control system in one dimension according to the teachings of the present invention;

FIG. 2 is a flowchart of an embodiment of a method of hybrid stabilization control according to the teachings of the present invention;

FIG. 3 is a flowchart of an embodiment of a method of generating position feedforward signal for feedforward stabilization according to the teachings of the present invention;

FIG. 4 is a flowchart of an embodiment of a method of generating position feedback signal for feedforward stabilization according to the teachings of the present invention;

FIG. 5 is a flowchart of an embodiment of a method of generating rate feedforward signal for feedforward stabilization control according to the teachings of the present invention;

FIG. 6 is a flowchart of an embodiment of a method of generating rate feedback signal for feedforward stabilization control according to the teachings of the present invention; and FIG. 7 is a more detailed functional block diagram of the hybrid stabilization control system in three dimensions according to the teachings of the present invention.

DETAILED DESCRIPTION OF THE INVENTION

The preferred embodiments of the present invention are illustrated in FIGS. 1–7, like reference numerals being used to refer to like and corresponding parts of the various drawings.

Figure 1:
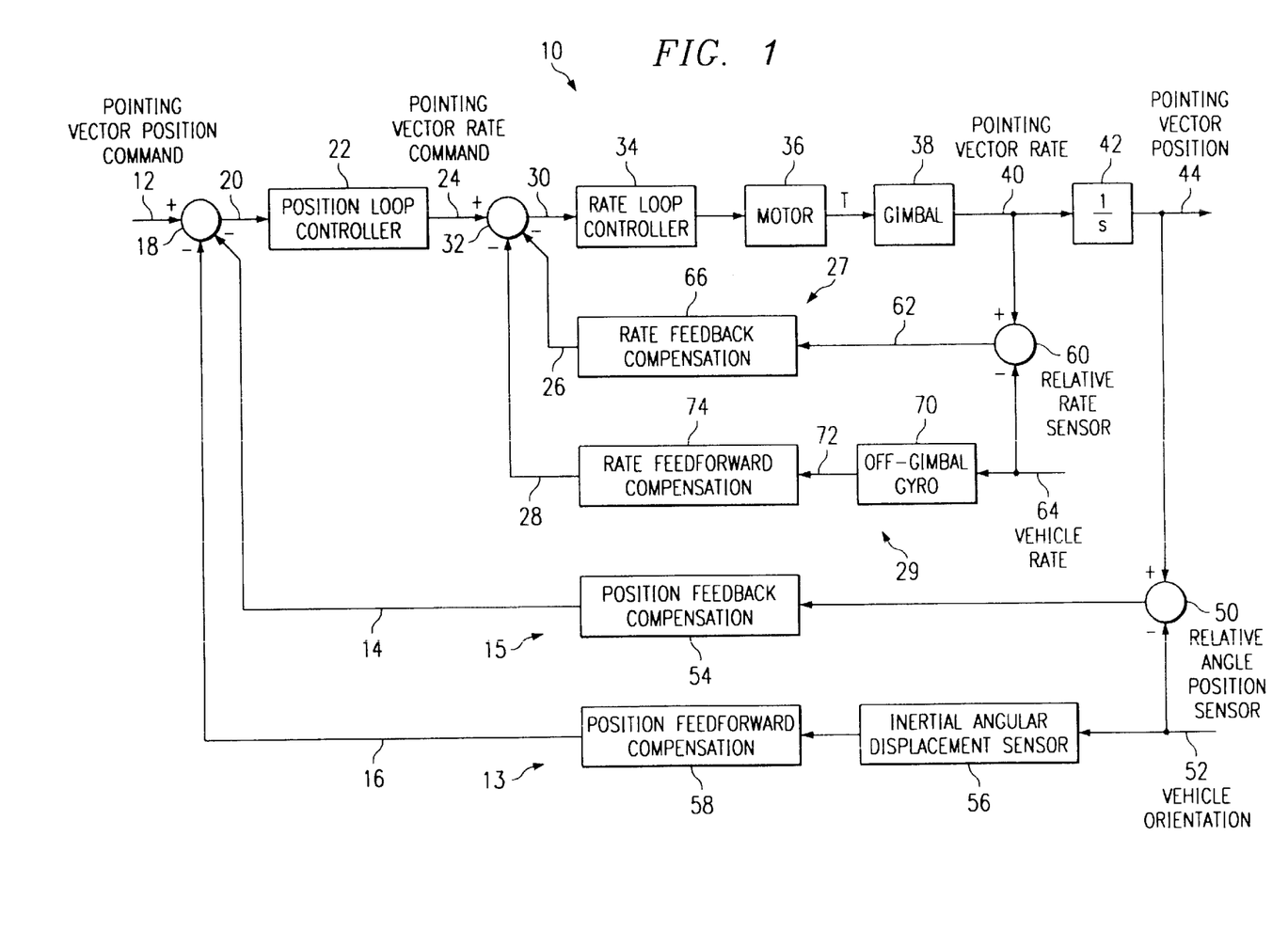

Referring to FIG. 1, an exemplary embodiment of a hybrid stabilization control system 10 is shown. Hybrid stabilization control system 10 may be used to isolate a pointing vector or line-of-sight vector to a target of a gimbal-mounted system from the motions of its platform or vehicle base. With stabilization, the pointing vector maintains its lock on the target even when its vehicle base moves and rotates. The stabilization technique is used to control the gimbal angular position and rate of rotation so that the pointing vector remains on target. Exemplary applications may include a gimbal-mounted imaging, optical, laser or antenna system mounted on a satellite, space probe, aircraft, automobile, missile, or any moving vehicle that may have rotational displacement in one or more axes.

Conventional stabilization control systems typically use rate feedback loops and/or position feedback loops. Further, conventional stabilization control systems typically concentrate on using more accurate and expensive rate and/or position sensors to provide better measurements or deriving better and more complex algorithms to further improve the accuracy of the sensor outputs. Stabilization control systems using rate feedforward alone or position feedforward alone have also been implemented previously. However, the novel combination of rate feedforward, rate feedback, position feedforward and position feedback has heretofore not been used for stabilization control systems. Hybrid stabilization control system 10 of the present invention employs rate and position feedback techniques as well as rate and position feedforward techniques to greatly improve gimbal stabilization. Further, the position feedforward technique has added accuracy due to latency compensation described below.

In hybrid stabilization control system 10, as shown in FIG. 1, a pointing vector position command 12 is compared with a position feedback signal 14 and a position feedforward signal 16 to generate a pointing vector position error 20. Pointing vector position error 20 represents the amount of angular position adjustment that should be made to maintain the pointing vector on the intended target. A first summer 18 is shown as a junction where position feedback signal 14 and position feedforward signal 16 combine to be compared with pointing vector position command 12. The output therefrom, pointing vector position error 20, is fed into a position loop controller 22, which generates a pointing vector rate command 24 in response to pointing vector position error 20. Alternatively, position loop controller 22 may receive pointing vector position command 12, position feedback compensation value 14, and position feedforward compensation value 16 to generate pointing vector rate command 24. Position loop controller 22 may be a microprocessor-based controller executing software functions which generate pointing vector rate command 24 from pointing vector position error 20.

Pointing vector rate command 24 is then compared with a rate feedback signal 26 and a rate feedforward signal 28 to generate a pointing vector rate error signal 30. A second summer 32 is shown as the junction where pointing vector rate command 24 is compared with rate feedback signal 26 and rate feedforward signal 28. The resultant pointing vector rate error 30 is provided to a rate loop controller 34, which generates a gimbal control signal or gimbal rate error signal received by a motor 36. Motor 36 generates a torque, T, in response to the gimbal control signal to change or maintain the orientation of a gimbal system 38 and therefore the direction of the pointing vector. Alternatively, rate loop controller 34 may receive pointing vector rate command 24, rate feedback compensation value 26, and rate feedforward compensation value 28 to generate the gimbal control signal. The sensor system is mounted on gimbal system 38. The torque signal is provided to gimbal system 38 so that the sensor system remains aimed at an intended target or object. A pointing vector rate signal 40 of gimbal system 38 is integrated by natural integrator 42 to generate a pointing vector position output 44.

Stabilization control system 10 includes a position feedback loop 15, a position feedforward loop 13, a rate feedback loop 27, and a rate feedforward loop 29, which generate signals 14, 16, 26 and 28 used to adjust or correct the position and rate command signals to controllers 22 and 34.

Position feedback loop 15 receives its input from a relative angle position sensor 50, which detects a relative angular displacement or position between pointing vector position 44 and vehicle orientation 52, and provides it to a position feedback compensation function or circuit 54. Relative angle position sensor 50 may be any sensor that is able to measure a relative angular displacement such as a resolver, encoder, potentiometer or the like. The output from position feedback compensation function or circuit 54 is provided to position summer 18 for generating adjusted pointing vector position command 20. Position feedback loop 15 may also be hereinafter referred to as the outer feedback loop.

Position feedforward loop 13 receives as its input an inertial vehicle orientation 52 detected by an inertial angular displacement or position sensor 56. An inertial orientation is generated and output to a position feedforward compensation function or circuit 58. Position feedforward compensation function or circuit 58 generates position feedforward signal 16 that is provided to first summer 18. Position feedforward loop 13 may also be hereinafter referred to as the outer feedforward loop.

Rate feedback loop 27 receives a rate input from a relative rate sensor 60, such as a tachometer, which senses a relative rate of movement 62 between pointing vector rate 40 and vehicle rate 64. Relative rate sensor 60 provides relative rate 62 to a rate feedback compensation function or circuit 66. Rate feedback compensation function or circuit 66 generates rate feedback signal 26, which is provided to rate summer 32. Rate feedback loop 27 may also be referred to hereinafter as the inner feedback loop.

Rate feedforward loop 29 may also be hereinafter referred to as the inner feedforward loop. Rate feedforward loop 29 includes an inertial rate sensor 70 such as a gyroscope that detects an inertial vehicle rate 64. Inertial rate sensor 70 is mounted on or in the vehicle or moving platform but not mounted on gimbal system 38. Typically, inertial rate sensor 70 is already in use and available on the vehicle as part of a guidance system or navigation system. Measured inertial vehicle rate 72 is provided to a rate feedforward compensation function or circuit 74, which generates rate feedforward signal 28 that is provided to rate summer 32.

Position feedback and feedforward compensation functions and circuits 54 and 58, respectively, and rate feedback and feedforward compensation functions and circuits 66 and 74, respectively, generally make corrections in measured position and rate quantities to compensate for sensor imperfections and to filter out or correct for undesirable signals such as noise. Many such compensation techniques are known in the art of control systems. Compensation may be unnecessary or very straightforward when relative sensors 50 and 60 and inertial sensors 56 and 70 provide sufficiently accurate measurements. Otherwise, the operating properties of the sensors may be characterized and compensation functions and/or circuits may be designed in response to the sensor operating properties. Further, position loop controller 22 and rate loop controller 34 employ conventional techniques for generating position and rate control signals respectively.

Exemplary references setting forth interrelationships of pointing vectors and angular rates, and gimbal kinematics include Rue, A. K. *Stabilization of Precision Electrooptical Pointing and Tracking Systems,* IEEE Transactions on Aerospace and Electronic Systems, Vol. AES-5, No. 5, September 1969; and DeBruin James C., *Derivation of Line-of-Sight Stabilization Equations for Gimbaled-mirror Optical Systems,* Proceedings of the SPIE, Vol. 1543, Active and Adaptive Optical Components, 1991. References setting forth exemplary circuits and/or techniques employed in the position and rate loop controllers include Ogata, K. Modern Control Systems, Prentice-Hall, N.S., 1970. References setting forth exemplary rate feedback and feedforward compensation and position feedback and feedforward compensation circuits and/or techniques include Ogata, K. Modern Control Systems, Prentice-Hall, N.S., 1970.

Figure 2:
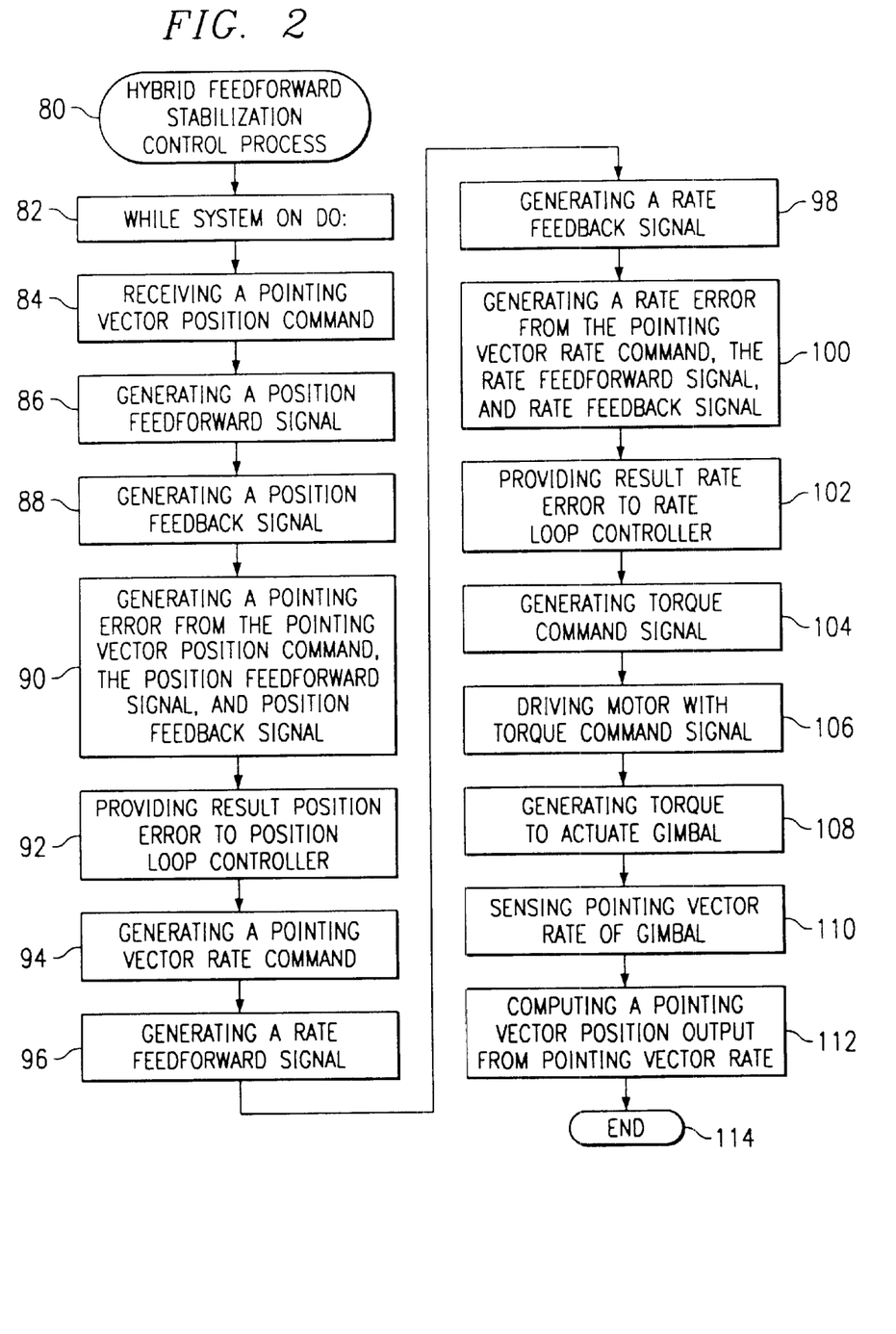

FIG. 2 is a flowchart of an embodiment of a method of feedforward stabilization control 80 according to the teachings of the present invention. The process is performed while the control system is on or while stabilization control is needed, as shown in block 82. A pointing vector position command is received, as shown in block 84. In blocks 86 and 88, a position feedforward signal and a position feedback signal are generated, respectively. Details of blocks 86 and 88 are shown in FIGS. 3 and 4, respectively.

Figure 3:
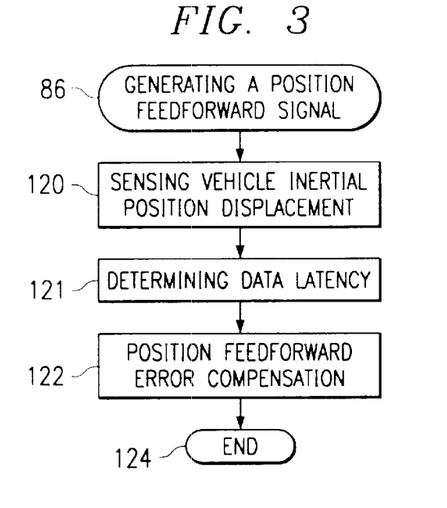

FIG. 3 is a flowchart of an embodiment of a method of generating position feedforward signal 86 for feedforward stabilization according to the teachings of the present invention. In block 120, the vehicle inertial position displacement is sensed or measured by a vehicle-mounted angular displacement sensor, for example. In block 122, algorithms or formulas which may be known in the art may be used to compensate for sensor inaccuracies and other limitations. A position feedforward signal is generated as a result. The process ends in block 124.

Figure 4:
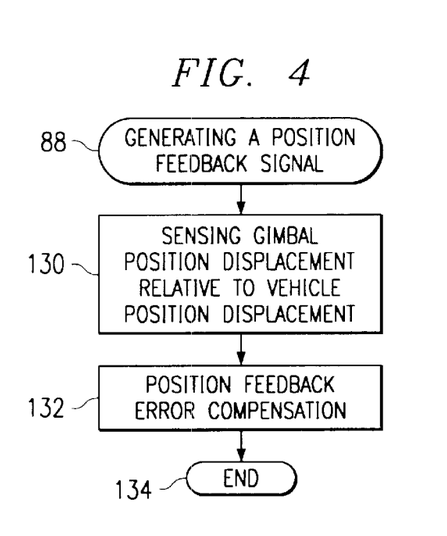

FIG. 4 is a flowchart of an embodiment of a method of generating position feedback signal 88 for feedforward stabilization according to the teachings of the present invention. In block 130, the gimbal position displacement relative to vehicle position displacement is sensed or measured. The relative position displacement measurement is provided to position feedback compensation, as shown in block 132. Position feedback compensation may execute known algorithms or formulas to compensate for sensor inaccuracies and other limitations. A position feedback signal is generated as a result. The process ends in block 134.

The position feedforward signal, the position feedback signal, and the pointing vector position command are combined, as shown in block 90 in FIG. 2. As a result, a position error is generated in response and provided to a position loop controller or control process, as shown in block 92. In block 94, a pointing vector rate command is generated by the position loop controller or control process. A rate feedforward signal and a rate feedback signal are generated, as shown in blocks 96 and 98.

Figure 5:
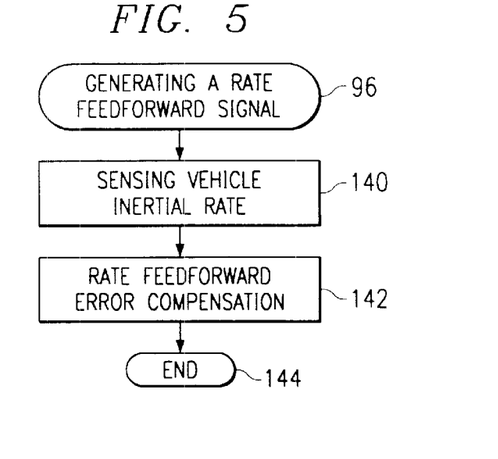

FIG. 5 is a flowchart of an embodiment of a method of generating a rate feedforward compensation signal 96 according to the teachings of the present invention. Referring also to FIG. 1, the vehicle inertial rate is measured by inertial rate sensor 70, such as a gyroscope that is mounted on the vehicle base, as shown in block 140. Using the measured vehicle inertial rate of rotation, a rate feedforward error compensation value is determined, as shown in block 142. This compensation value is then used to generate rate feedforward signal 28 provided to second summer 32. The process of generating a rate feedforward compensation value ends in block 144.

Figure 6:
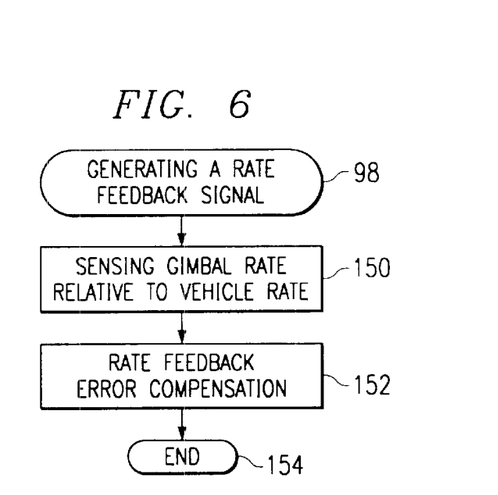

FIG. 6 is a flowchart of an exemplary embodiment of a method of generating rate feedback compensation signal 98 according to the teachings of the present invention. Referring also to FIG. 1, the gimbal rate relative to the vehicle rate is measured by relative rate sensor 60, such as a tachometer, as shown in block 150. Using the measured relative rate, a rate feedback error compensation value is determined, as shown in block 152. This compensation value is then used to generate rate feedback signal 26 provided to rate summer 32. The process of generating a rate feedforward compensation value ends in block 154.

Figure 7A:
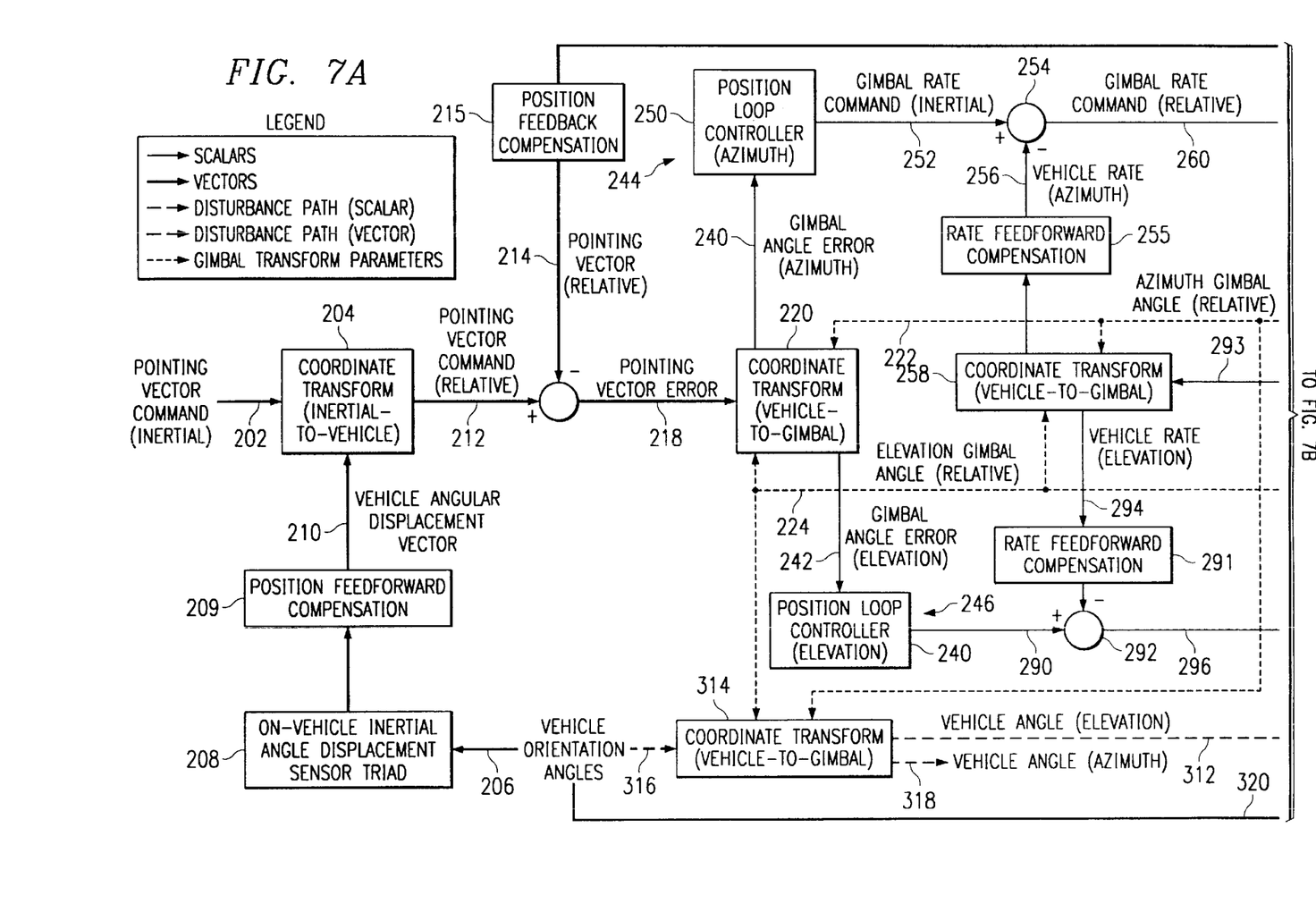
Figure 7B:
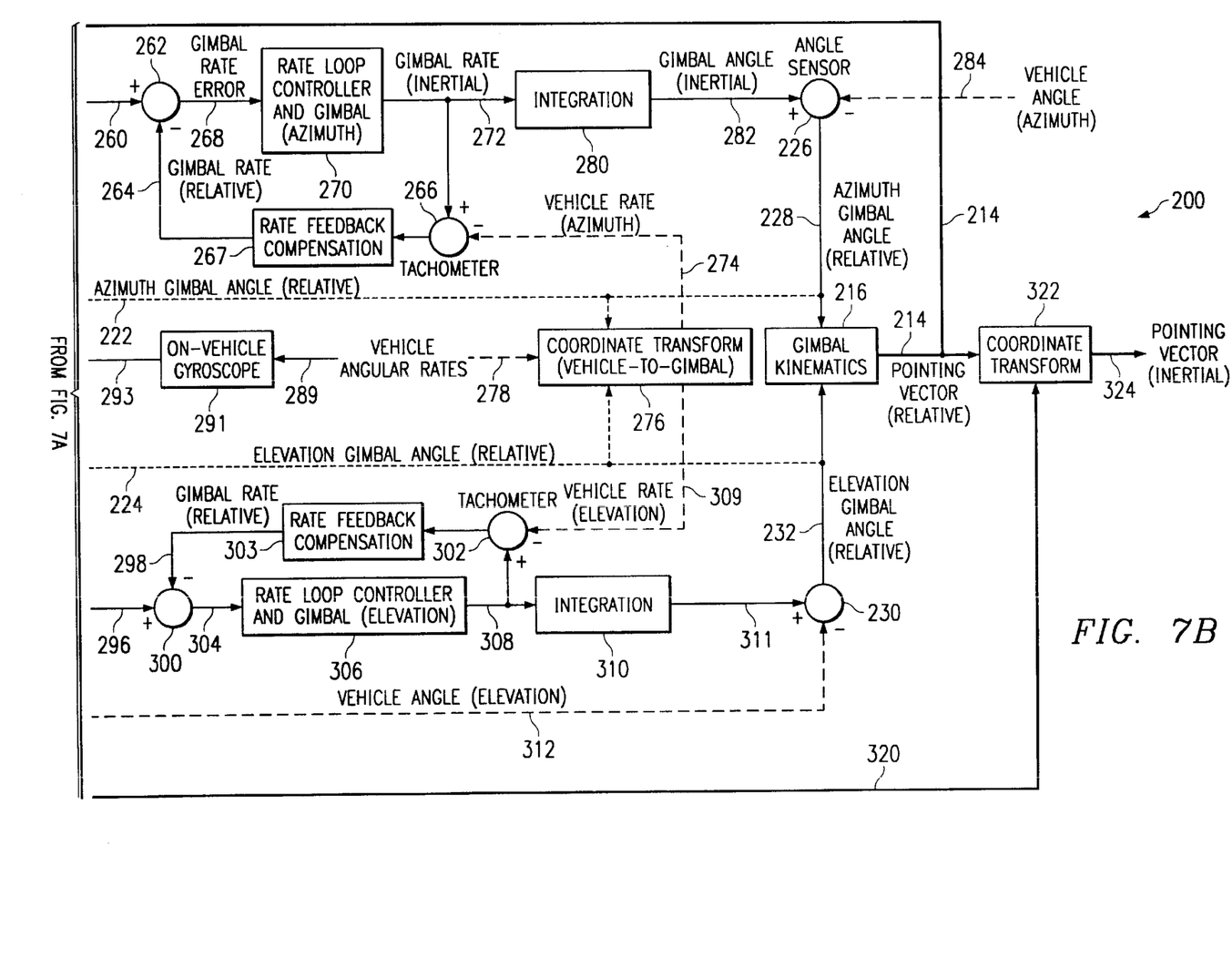

FIG. 7 is a more detailed functional block diagram of the hybrid stabilization control system in three dimensions 200 according to the teachings of the present invention. Recall that FIG. 1 is a functional block diagram of the hybrid stabilization control system in one dimension. Therefore, the three dimensional diagram expands the same technique and methodology to three dimensions to more fully describe the inventive concepts.

A pointing vector command 202 relative to inertial space is received by a coordinate transform function or circuit 204 to transform the frame of reference of the pointing vector command to the vehicle base. Pointing vector command 202 is a vector which may have three scalar direction cosine components or azimuth and elevation angular positions, etc. The command may have been generated by another function such as a tracking system (not shown) or manually entered by a user. Coordinate transformation 204 receives vehicle angular displacement vector 210 as parametric input for the transformation function. Vehicle angular displacement vector 210 is measured by an on-vehicle inertial angle displacement or position sensor triad 208, which measures the orientation angles (for example, yaw, pitch and roll angles) 206 of the vehicle base with respect to inertial space. The vehicle orientation angles also enter or affect the control system as disturbances described by a disturbance path vector 316 received by coordinate transformation 314.

Relative pointing vector command 212 at the output of coordinate transformation 204 is compared with a pointing vector 214 relative to the vehicle base fed back from the output of hybrid stabilization control system 200 to generate a pointing vector error signal 218. Pointing vector error 218 is then coordinate transformed from the vehicle frame of reference to the gimbal frame of reference at block 220. Coordinate transformation block 220 receives, as parametric input, a relative azimuth gimbal angle 222 and a relative elevation gimbal angle 224 in order to perform the coordinate transformation. Pointing vector error 218 is transformed to an azimuth gimbal angle error 240 and an elevation gimbal angle error 242. Azimuth gimbal angle error 240 is provided to an azimuth gimbal loop 244 and elevation gimbal angle error 242 is provided to an elevation gimbal loop 246.

Azimuth gimbal loop 244 receives azimuth gimbal angle error 240, which is provided to an azimuth position loop controller 250. Azimuth position loop controller 250 may be a microprocessor executing software code or a circuit performing control functions to generate an azimuth gimbal rate command 252 with respect to inertial space to correct the gimbal angle error in the azimuth axis. Inertial azimuth gimbal rate command 252 is converted to the vehicle frame of reference by taking into account the azimuth component of vehicle rate 256 fed forward from coordinate transformation block 258. This is the azimuth component of the rate feedforward loop. Coordinate transformation 258 receives a vehicle rate vector 293 measured by on-vehicle gyroscope triad 291 and translates the frame of reference from the vehicle to the gimbal because the gyroscope sensitive axes are typically not in alignment with the axes of the gimbal. Gyroscopes 291 measure the angular motion 289 of the vehicle base. Therefore, path 289 is the measurement path of the vehicle base motion in the form of angular rates, and path 278 may be thought of as the disturbance path describing how vehicle motion affects the pointing vector position. As shown, summer 254 receives inertial azimuth gimbal rate command 252 and the azimuth component 256 of the vehicle rate to generate a relative azimuth gimbal rate command 260.

Azimuth gimbal rate command 260 is provided to another summer 262, which also receives a gimbal rate feedback signal 264 relative to the vehicle base. A gimbal rate error 268 is generated as a result, which is provided to a rate loop controller 270 that generates a control signal (torque) provided to adjust the azimuth rate of rotation of gimbal 270 (the rate loop controller and gimbal are shown as one block 270 to conserve space). The resultant gimbal rate of rotation 272 is used to keep the pointing vector pointed at the intended target. Gimbal angular rate 272 is measured with resepct to the gimbal by a sensor 266 such as a tachometer. Sensor 266 measures gimbal angular rate 272 along with vehicle angular rate 274 (azimuth component) and generates a gimbal rate 264 relative to the vehicle base that is provided to summer 262. Vehicle rate 274 may be thought of and is shown as a scalar disturbance that enters the system at tachometer 266. Further, vehicle angular rates enter the system as a disturbance vector 278 at coordinate transformation 276. Gimbal angular rate 272 is integrated to angular position 282 by the natural integrator of the gimbal 280. An angle sensor 226 measures gimbal angle 282 relative to the azimuth vehicle angle 284 and generates an azimuth gimbal angle 228 relative to the vehicle base. This azimuth gimbal angle 228 is the input provided to a gimbal kinematics block 216 representing the physics of the gimbal system that receives the commands and orients the pointing vector relative to the vehicle base.

A second input to gimbal kinematics 216 comes from the elevation gimbal loop 246. Elevation gimbal loop 246 includes an elevation position loop controller 240, which receives an elevation gimbal angle error 242 and generates an inertial gimbal elevation rate command 290. Inertial gimbal elevation rate command 290 is converted by summer 292 to a relative rate command by taking into account the elevation component of a vehicle rate 294 fed forward from coordinate transform block 258. Coordinate transformation 258 receives a vehicle rate 293 measured by on-vehicle gyroscope triad 291. Gyroscope triad 291 measures the angular motion 289 of the vehicle base on which the gimbal assembly is mounted. Summer 292 generates a relative gimbal elevation rate command 296, which is provided to a summer 300 along with a relative gimbal rate 298 fed back from a sensor 302 such as a tachometer. Sensor 302 measures both gimbal angular rate 308 and the vehicle angular rate 309 and provides feedback gimbal rate signal 298 to summer 300. In this manner, gimbal elevation rate command 296 is compared with measured relative gimbal rate 298 and a gimbal elevation rate error 304 is generated. Gimbal elevation rate error 304 is provided to a rate loop controller and the gimbal it controls 306. The rate loop controller generates a gimbal control signal (torque) for the elevation axis in response to gimbal elevation rate error 304. Sensor or tachometer 302 measures the resultant gimbal elevation rate of rotation 308, and provides relative feedback rate signal 298 to summer 300. Gimbal rate 308 is integrated by natural integrator 310 of the gimbal to generate a gimbal angular position 311 in the elevation axis, which is provided to a angle sensor 230. Angle sensor 230 measures gimbal angular position relative to vehicle angular position 312 to generate a relative elevation gimbal angle 232. This signal is provided to gimbal kinematics 216, which is the physics of the gimbal axes that orient the pointing vector. Pointing vector 214 relative to the vehicle base results. A coordinate transformation 322 translates the pointing vector relative to inertial space to yield pointing vector 324 relative to inertial space, which results in the final direction the pointing vector points at. Operating in this manner, the pointing vector of the gimbaled sensor system is isolated from the motions of the vehicle base to remain directed at the intended target. The present invention is especially beneficial to control systems where an on-gimbal gyroscope is not available.

Although several embodiments of the present invention and its advantages have been described in detail, it should be understood that mutations, changes, substitutions, transformations, modifications, variations, and alterations can be made therein without departing from the teachings of the present invention, the spirit and scope of the invention being set forth by the appended claims.

What is claimed is:

1. A hybrid stabilization system for isolating a pointing vector of a gimbal from the motion of a vehicle base, comprising:
   a rate feedback loop generating a rate feedback compensation value in response to a measured rate difference between a pointing vector rate of motion and a vehicle base rate of motion;
   a rate feedforward loop generating a rate feedforward compensation value in response to a measured inertial vehicle base rate of motion;
   a position feedback loop generating a position feedback compensation value in response to a measured position difference between a pointing vector angular position and a vehicle base angular position;
   a position feedforward loop generating a position feedforward compensation value in response to a measured inertial vehicle base angular position; and
   a controller receiving a pointing vector position command and generating a gimbal control signal in response to the rate feedback compensation value, rate feedforward compensation value, position feedback compensation value, and position feedforward compensation value.

2. The hybrid stabilization system, as set forth in claim 1, further comprising a relative rate sensor measuring the rate differences between a pointing vector rate of motion and a vehicle base rate of motion along azimuth and elevation axes.

3. The hybrid stabilization system, as set forth in claim 2, wherein the relative rate sensor includes a tachometer.

4. The hybrid stabilization system, as set forth in claim 1, further comprising an inertial rate sensor measuring the inertial vehicle base rate of motion along azimuth and elevation axes.

5. The hybrid stabilization system, as set forth in claim 4, wherein the inertial rate sensor includes a gyroscope triad mounted on the vehicle base.

6. The hybrid stabilization system, as set forth in claim 1, further comprising a relative angular position sensor measuring the position difference between each gimbal axis and its base.

7. The hybrid stabilization system, as set forth in claim 6, wherein the relative angular position sensor includes a resolver.

8. The hybrid stabilization system, as set forth in claim 1, further comprising an inertial angular position sensor measuring the inertial vehicle base angular position along pitch, yaw and roll axes.

9. The hybrid stabilization system, as set forth in claim 8, wherein the inertial angular position sensor includes an inertial angular displacement sensor triad.

10. The hybrid stabilization system, as set forth in claim 1, wherein the controller comprises a position loop controller receiving the pointing vector position command and generating a pointing vector rate command in response to the position feedback compensation value and the position feedforward compensation value.

11. The hybrid stabilization system, as set forth in claim 1, wherein the controller comprises a rate loop controller receiving the pointing vector rate command and generating a gimbal control signal (torque) in response to the rate feedback compensation value and the rate feedforward compensation value.

12. A hybrid stabilization system for isolating a pointing vector of a gimbal from the motion of a measurable disturbance, comprising:
    a relative rate sensor measuring a rate difference between a pointing vector rate of motion and a disturbance rate of motion;
    a rate feedback loop generating a rate feedback compensation value in response to the rate difference;
    an inertial rate sensor measuring an inertial disturbance rate of motion;
    a rate feedforward loop generating a rate feedforward compensation value in response to the inertial disturbance rate;
    a relative angular position sensor measuring a position difference between a pointing vector angular position and a disturbance angular position;
    a position feedback loop generating a position feedback compensation value in response to the position difference;
    an inertial angular position sensor measuring an inertial disturbance angular position;
    a position feedforward loop generating a position feedforward compensation value in response to the inertial disturbance angular position; and
    a controller receiving a pointing vector position command and generating a gimbal control signal in response to the rate feedback compensation value, rate feedforward compensation value, position feedback compensation value, and position feedforward compensation value.

13. The hybrid stabilization system, as set forth in claim 12, wherein the sensor measurements provide rate and position measurements in three dimensions, and the rate and position feedback and feedforward loops generate compensation values for three dimensions.

14. The hybrid stabilization system, as set forth in claim 12, wherein the inertial and relative rate sensors measure rates of motion along azimuth and elevation axes.

15. The hybrid stabilization system, as set forth in claim 12, wherein the inertial and relative angular position sensors measure angular positions about appropriate vehicle and gimbal axes.

16. The hybrid stabilization system, as set forth in claim 12, wherein the controller comprises a position loop controller receiving the pointing vector position command and generating a pointing vector rate command in response to the position feedback compensation value and the position feedforward compensation value.

17. The hybrid stabilization system, as set forth in claim 16, wherein the controller comprises a rate loop controller receiving the pointing vector rate command and generating a gimbal control signal (torque) in response to the rate feedback compensation value and the rate feedforward compensation value.

18. The hybrid stabilization system, as set forth in claim 12, wherein the relative rate sensor includes a tachometer.

19. The hybrid stabilization system, as set forth in claim 12, wherein the inertial rate sensor includes a gyroscope triad measuring the inertial rate of the disturbance.

20. The hybrid stabilization system, as set forth in claim 12, wherein the relative angular position sensor includes a resolver.

21. The hybrid stabilization system, as set forth in claim 12, wherein the inertial angular position sensor includes an inertial angular displacement sensor triad.

22. A hybrid stabilization method for isolating a pointing vector of a gimbal from the motion of a vehicle base, comprising:

generating a rate feedback compensation value in response to a measured rate difference between a pointing vector rate of motion and a vehicle base rate of motion;

generating a rate feedforward compensation value in response to a measured inertial vehicle base rate of motion;

generating a position feedback compensation value in response to a measured position difference between a pointing vector angular position and a vehicle base angular position;

generating a position feedforward compensation value in response to a measured inertial vehicle angular position; and receiving a pointing vector position command and generating a gimbal control signal in response to the rate feedback compensation value, rate feedforward compensation value, position feedback compensation value, and position feedforward compensation value.

23. The hybrid stabilization method, as set forth in claim 22, further comprising measuring the rate differences between a pointing vector rate of motion and a vehicle base rate of motion along azimuth and elevation axes.

24. The hybrid stabilization method, as set forth in claim 22, further comprising measuring the inertial vehicle base rate of motion along azimuth and elevation axes.

25. The hybrid stabilization method, as set forth in claim 22, further comprising measuring the position difference between a pointing vector angular position and a vehicle base angular position.

26. The hybrid stabilization method, as set forth in claim 22, further comprising measuring the inertial vehicle base angular position in three dimensions.

27. The hybrid stabilization method, as set forth in claim 22, further comprising generating a pointing vector rate command in response to the position feedback compensation value and the position feedforward compensation value.

28. The hybrid stabilization method, as set forth in claim 22, further comprising generating a gimbal control signal in response to the rate feedback compensation value and the rate feedforward compensation value.

29. A hybrid stabilization method for isolating a pointing vector of a gimbal from the motion of a vehicle base, comprising:

measuring a rate difference between a pointing vector rate of motion and a vehicle base rate of motion;

generating a rate feedback compensation value in response to the rate difference;

measuring an inertial vehicle base rate of motion;

generating a rate feedforward compensation value in response to the inertial vehicle base rate;

measuring a position difference between a pointing vector angular position and a vehicle base angular position;

generating a position feedback compensation value in response to the position difference;

measuring an inertial vehicle base angular position;

generating a position feedforward compensation value in response to the inertial vehicle angular position; and receiving a pointing vector position command and generating a gimbal control signal in response to the rate feedback compensation value, rate feedforward compensation value, position feedback compensation value, and position feedforward compensation value.

30. The hybrid stabilization method, as set forth in claim 29, wherein the sensor measuring comprises measuring rate and position measurements in three dimensions, and rate and position feedback and feedforward generating comprises generating compensation values for three dimensions.

31. The hybrid stabilization method, as set forth in claim 29, wherein inertial and relative rate measuring comprises measuring rates of motion along azimuth and elevation axes.

32. The hybrid stabilization method, as set forth in claim 29, wherein inertial and relative angular position measuring comprises measuring pitch, yaw, and roll angular positions.

33. The hybrid stabilization method, as set forth in claim 29, further comprising generating a pointing vector rate command in response to the position feedback compensation value and the position feedforward compensation value.

34. The hybrid stabilization method, as set forth in claim 33, further comprising generating a gimbal control signal in response to the rate feedback compensation value and the rate feedforward compensation value.

* * * * *